United States Patent Office 3,398,125
Patented Aug. 20, 1968

3,398,125
POLYMERIZATION OF ALLYLIC ESTERS
Sol A. Mednick, Baltimore, Md., assignor to FMC Corporation, New York, N.Y., a corporation of Delaware
No Drawing. Filed Sept. 8, 1965, Ser. No. 485,939
5 Claims. (Cl. 260—78.4)

ABSTRACT OF THE DISCLOSURE

This specification discloses a method of producing diallyl phthalate prepolymer by polymerizing diallyl phthalate monomer at a temperature under 225° C. while continuously adding to the polymerization mixture a free-radical polymerization promoter whose effect is sharply reduced within a few minutes after the addition is stopped. The polymerization is completed by heat alone to the point where the residual polymerization promoter is reduced to a few parts per million. The prepolymer can be separated by a conventional solvent extraction process or in the wiped film distillation process taught in copending Ser. No. 485,882 filed simultaneously with this application.

---

This invention relates to a method of polymerization of allyl esters of polybasic acids, in particular the various diallyl phthalates, and aims to provide a polymerization process which produces a polymerization dope substantially free of residual catalyst in a short time with improved polymerization rate control at a relatively low temperature, whereby the product is of good color and relatively high molecular weight, and which dope is useful either in the conventional process of making soluble polymers by solvent extraction or in the wiped film vacuum distillation process taught in my copending applications with L. Seglin and W. B. Tuemmler, Ser. No. 396,508, filed Sept. 15, 1964, and Ser. No. 485,882, filed simultaneously herewith.

The first synthetic polymers—the phenol-formaldehyde resins—and their immediate descendants such as the alkyd, urea-formaldehyde and melamine-formaldehyde poymers are all thermosetting resins. The components of these resins can be reacted in stages, to first form solid soluble, fusible, storable polymers of moderate molecular weight which are, at this intermediate stage of cure, compounded with fillers, pigments, solvents and the like, to produce compositions which can be formed into films, laminated structures and molded articles and which can then be converted into the insoluble and infusible state by further treatment, generally by using heat with or without catalyst. These polymers are known as condensation polymers because they polymerize in large part by elimination of water between molecules.

With the progress of polymer chemistry, it was early recognized that, in general, cross-linking thermosetting resins can be made from any organic compounds which contain a plurality of double bonds which are unconjugated with respect to carbon for example, divinyl-benzene, the allyl acrylates, and especially the polyalkenyl esters of polybasic acids such as the diallyl phthalates. However, unlike the condensation polymers, the preparation of useful, soluble, fusible intermediates is not a simple matter.

In the case, for example, of the polyalkenyl esters of polybasic acids such as the diallyl and dimethallyl phthalates, polymerization is easily induced by peroxide catalysts and heat; but useful products are not easily obtained. In general such a polymerization, whether in mass, in suspension or in emulsion form, gels to an insoluble, three-dimensional network while the major portion of the monomer is still unreacted; and the gelled mixture, containing a major portion of monomer, is no longer readily useful to the preparation of films, laminates or molding compositions. If polymerization is stopped even just short of gelation, so much monomer remains that further conversion is slow and is accompanied by excessive shrinkage. In the case of diallyl phthalates, conversions in excess of about 35% cannot normally be obtained before gelation. As a result, such polymers were not commercially useful until the discovery of a method of separating monomer from the polymer in the ungelled polymerization mixture just prior to gelation, as taught by Pollack, Muskat and Strain in U.S. Patents 2,273,891; 2,370,578 and 2,377,095. As described in these patents, monomer is polymerized, at low conversions, to form a soluble, fusible polymer having residual unsaturation. The prepolymer is precipitated with methanol or some other solvent which retains the monomer in solution, and is then isolated for compounding, forming, and final cure to an insoluble resin. This, of necessity, produces a high cost resin, since it means the conversion of only a minor proportion of the monomer and the recovery and recycling of unreacted monomer, together with very large quantities of solvent.

Despite their high cost, these soluble allylic polymers, generally known as prepolymers, have found a place in industry. They are particularly valuable for the production of molded parts which show excellent electrical properties, particularly under conditions of high humidity. They mold especially well and cure with minimum shrinkage, so that they are useful in the preparation of parts which require accurate molding; and they are useful in the production of laminates since they can produce superior laminates under relatively low pressure conditions, so that they are useful in the treatment of many sorts of bases (for example, wood veneer) which would be crushed if they were laminated under high pressure.

In the twenty-odd years which have elapsed since these prepolymers were first commercialized, a great deal of effort has gone into the problem of reducing their cost while retaining their excellent properties. Only one method, other than precipitation from methanol, has proven commercially acceptable for the separation of unconverted monomer from prepolymer, that is the liquid-liquid extraction with aqueous acetone described in the Anderson et al. patent, No. 2,613,201 of Oct. 7, 1952. This process offers very little advantage over the methanol process, except for slightly less plant handling.

Considerable work has been done on the obvious expedient of vacuum distilling unreacted monomer from the so-called "dope" obtained by the bulk or other polymerization of the monomer, which produces a low concentration (20–35%) solution of prepolymer in unreacted monomer. However, this expedient has not been used commercially because it just has not worked to produce satisfactory prepolymer.

It has been possible to remove monomer from some dopes by vacuum distillation and obtain prepolymers without gelling, as described in the Wagers et al. U.S. Patent 2,466,314, issued Aug. 3, 1948. However, as pointed out in my copending application with Seglin and Tuemmler, Ser. No. 396,508, such prepolymers are successfully processed only because the dopes from which they are produced contain impurities which function as polymerization inhibitors resulting in final products which require 3 to 4 times as long for conversion as the commercial but expensive prepolymers obtained by the conventional solvent processes. For example, a diallyl phthalate monomer which is bulk polymerized for 2½ hours at 250° C. without gelation, as disclosed in Wagers et al., produces a dope containing polymerization inhibitors. The product resulting from the process cures so slowly that it is unsatisfactory in molding applications. Diallyl phthalate free of these inhibitors will produce a gel at 250° C. in under two hours.

When inhibitor-free dopes are vacuum distilled in conventional fashion even at very low pressures, gelation always ensues before the monomer present is reduced to a sufficiently low level to produce a commercially acceptable prepolymer.

In my above identified joint copending application Ser. No. 396,508, it was pointed out that a diallyl phthalate dope could be successfully vaccum distilled if (1) There is used a diallyl phthalate which in the absence of polymerization catalyst will polymerize at 200° C. under nitrogen at a rate indicated by an increase of refractive index ($N_D^{25}$) of at least about 0.000012 per minute;

(2) The product is polymerized under conditions which leave no significant amount of catalyst residue in the polymerization dope. This is done by polymerizing either without catalyst, or with a catalyst in such small concentration that it is substantially destroyed during the preparation of the dope; and (3) The dope is distilled continuously under high vacuum in a still of short residence time, in which the dope is spread as a thin film in order to insure rapid heat transfer and high evaporative surface, at an elevated temperature such that the viscous residue will flow from the still.

I have discovered a method of polymerization which produces a dope which is satisfactory for continuous high vacuum thin film distillation which can utilize monomers which have much slower thermal polymerization rates than is indicated by the .000012 per minute increase of refractive index. Moreover, my method produces a polymerization dope characterized by extremely good color, satisfactory high average molecular weight, excellent control over the polymerization rate and a short residence time for polymerization as compared with standard low temperature polymerization techniques.

According to my invention I polymerize a diallyl phthalate at a temperature not in excess of about 225° C., and preferably at 200° C. or less, by continuously subjecting the polymerization mixture to free-radical initiators during the early stages of the polymerization, and finishing the polymerization thermally for a period of time, without additional exposure to fresh free-radical initiators, to reduce any residual free-radical initiators in the dope to a content of the order of a few parts per million or less. The free-radical initiation may be ultraviolet light, or it may be air diluted with nitrogen (which presumably forms peroxides in-situ) but most conveniently is a catalyst such as an organic peroxide or azo-bis-butyronitrile, with a half-life of the order of a few minutes or less (preferably under about two minutes) at the polymerization temperature. With such catalysts, thermal polymerization for a period of about ten times the half-life of the catalyst is sufficient to reduce the content of free-radical initiation down to a few parts per million or less.

The catalyst may be added at a uniform rate throughout its addition, or it may be added at somewhat varying rates. With monomers whose inherent thermal rates of polymerization are very low, it is sometimes useful to add catalyst till close to the end of the polymerization, reducing the addition rate to a fraction of a part per million per minute toward the end, so that elimination of residual catalyst takes place in a very short time with straight thermal polymerization at the end of the reaction cycle.

One way of adding a catalyst is by bubbling air diluted with nitrogen through the reaction mixture or by passing it over the surface of a thin layer of reaction mixture, continuing the use of the nitrogen diluted air as desired, and finally flushing the system with nitrogen during the completion of the thermal polymerization. Such a polymerization may be thermally initiated, or it may be initiated with the use of a very small amount of a long half-life catalyst—for example t-butyl hydroperoxide, which has a half-life of 23 minutes at 200° C.

More desirably, catalysts are used which have short half-lives at the temperature of polymerization, for example t-butyl perbenzoate which has a half-life of two seconds at 200° C., di-t-butyl peroxide which has a half-life of 0.4 minute at 200° C., or benzoyl peroxide, which has a half-life of 0.2 minute at 150° C.

As is well known the use of lower temperatures gives higher average molecular weights for any given final dope viscosity, so that the practice of this invention gives products of desirably high molecular weight. By operating at about 200° C. products are obtained which are directly comparable to prior art products made by known techniques and using solvent separation. By operating at lower temperatures it is possible to get products with higher average molecular weights.

The following examples typify the invention and are not given as limiting hereof.

EXAMPLE 1.—POLYMERIZATION OF DIALLYL PHTHALATE WITH CONTINUOUS AIR INITIATION

Diallyl phthalate, 60 lbs., was heated to 200° C. and t-butyl hydroperoxide, 1.36 g. in 136 ml. of diallyl phthalate, 50 p.p.m. was added. A mixture of air and nitrogen, 4.0% $O_2$ by volume was swept across the surface of the reaction mixture. After 295 minutes, the refractive index at 25° C. increased from 1.5196 to 1.5326 and the reaction viscosity at 25° C. increased to 400 c./s. Thereafter the air nitrogen mixture in the reactor was replaced with nitrogen; the polymerization was terminated by rapid cooling. The polymer was separated from the unreacted monomer by continuous distillation in accordance with U.S. application Ser. No. 396,508 filed Sept. 15, 1964 and contained only 3.9% methanol extractable material. This polymer cured rapidly after formulation in a conventional compound and an excellent heat distortion of 174° C. was obtained.

EXAMPLE 2.—POLYMERIZATION OF DIALLYL PHTHALATE WITH CONTINUOUS PEROXIDE INITIATION

Diallyl phthalate, 140 lbs. prepared by the toluene sulfuric acid catalyzed reaction of phthalic anhydride with allyl alcohol was heated to 200° C. under an atmosphere of pure nitrogen. A solution of di-t-butyl peroxide (10 g. per liter of diallyl phthalate) was then added continuously at the rate of 6.25 ml. per minute. After 70 minutes, the peroxide feed was terminated. A total of 79 p.p.m. had been added, 1.0 p.p.m. per minute. The refractive index rose from 1.5187 to 1.5311. After a total of 190 minutes when the refractive index was 1.5324 the reaction viscosity was 500 c./s., and the polymerization was terminated by cooling rapidly. The polymer, separated by continuous distillation (1.5% methanol soluble material) was formulated in a convenient molding compound, which, when cured in a conventional manner, had excellent properties equivalent to standard commercial material made by the solvent-extraction process.

Note that the total reaction time was just over three hours, as compared with ten hours for conventional polymerization methods. Hence, the method is useful not only to produce dopes which can be separated by distillation, but also in the production of dopes for the conventional solvent precipitation separation technique.

EXAMPLE 3.—POLYMERIZATION OF DIALLYL ISOPHTHALATE WITH CONTINUOUS PEROXIDE INITIATION

Diallyl isophthalate, 140 lbs. obtained by the p-toluenesulfonic acid-catalyzed reaction of isophthalic acid with allyl alcohol, was heated to 200° C. under an atmosphere of pure nitrogen. Di-t-butyl peroxide, 10 g. per liter in diallyl isophthalate was then added at the rate of 6.6 ml. per minute. After 282 minutes, when the refractive index rose from 1.5211 to 1.5328 and the reaction viscosity increased to 340 c./s., the addition of peroxide was terminated. A total of 290 p.p.m. of peroxide was added at 1.0 p.p.m. per minute. At 348 minutes peroxide addition was again started and a total of 12 p.p.m. was added at 1.2 p.p.m. per minute. At 393 minutes 2.4 p.p.m. of peroxide was added in two minutes. After 445 minutes, when the refractive index was 1.5343 and the reaction viscosity was 1000 c./s., the polymerization was terminated by cooling. After separation by continuous distillation, the polymer contained 4.1% methanol soluble material.

EXAMPLE 4.—POLYMERIZATION OF DIALLYL PHTHALATE WITH AZO - BIS - ISOBUTYRONITRILE

Two hundred pounds of diallyl phthalate was heated to 200° C., and azo-bis-isobutyronitrile, dissolved in monomer, was added at the rate of 1 p.p.m. per minute for 285 minutes at which time the refractive index of the dope was 1.5310 (original 1.5176). Addition of catalyst was stopped, and heating for an additional 135 minutes without catalyst addition, to a final refractive index of 1.5323. This change in rate is typical of the process of this invention; after catalyst addition ceases, the polymerization rapidly slows down to the inherent thermal rate, and residual catalyst is rapidly exhausted.

The product of this example gave acceptable prepolymer, with the continuous distillation method of U.S. application Ser. No. 396,508 filed Sept. 15, 1964, and by conventional solvent precipitation techniques.

EXAMPLE 5.—POLYMERIZATION WITH T-BUTYL PERBENZOATE

Example 4 was repeated, using t-butyl perbenzoate. It was added at the rate of 1.0 p.p.m. per minute for one hour; during this portion of the polymerization, the average increase in refractive index was .0001 per minute. Thermal polymerization was continued for two hours, during which time the increase in refractive index was .000012 per minute. Catalyst addition was then resumed for 50 minutes, with an average increase in refractive index of .00011 per minute. The rate tailed off rapidly on further heating for 160 minutes, going back to the rate of .000012 per minute. The finished dope had a refractive index of 1.5330, and gave satisfactory prepolymer both by continuous distillation and standard solvent precipitation technique.

EXAMPLE 6.—DIALLYL PHTHALATE

A polymerization of diallyl phthalate was run at 190° C., using di-t-butyl peroxide, adding 1 p.p.m. per minute, dissolved in monomer, and a monomer with a presumed high thermal polymerization rate. Catalyst addition was ended after 70 minutes, for an average increase of .00017 in refractive index per minute. Within ten minutes the rate had decreased to .000008 per minute; thermal polymerization was continued for two hours. At this point, it was decided to speed up the rate, and catalyst addition was continued at the rate of .05 p.p.m. per minute for 90 minutes, raising the polymerization rate to .00002 increase in refractive index per minute. Thermal polymerization for ten minutes thereafter gave a satisfactory dope, which produced excellent prepolymer.

Obviously, examples can be multiplied indefinitely without departing from the scope of the invention as defined in the claims. I have successfully polymerized the various diallyl phthalates with a substantial number of additional catalysts, at temperatures up to 220° C. and as low as 150° C. Catalysts I have used include 2,5-dimethyl-2,5-di(t-butyl peroxy)hexane (half-life 1.6 minutes at 170° C., 0.1 minute at 200° C.); 2,5-dimethyl-hexane-2,5-diperoxybenzoate (catalyst half-life 1.1 minutes at 150° C., 0.2 minute at 165° C.) and dibenzoyl peroxide on the low end of the scale, and more stable catalysts, at higher temperatures. It is only necessary to choose a catalyst with the necessary short half-life at the desired polymerization temperature.

I claim:

1. The method of producing a diallyl phthalate prepolymer which is readily separable from the prepolymer-monomer mixture which comprises polymerizing a diallyl phthalate in the substantial absence of water by heating at a temperature between 150° C. and 225° C. while continuously subjecting the polymerization mixture to a free radical initiator whose effect is reduced by at least one-half within a few minutes after the polymerization is no longer subject to fresh application thereof, and completing the polymerization by heat alone to a point short of gellation for a period sufficient to reduce residual polymerization promoter in the polymerization mixture to a content not in excess of a few parts per million.

2. The method of producing a diallyl phthalate prepolymer which is readily separable from the prepolymer-monomer mixture which comprises polymerizing a monomer in the substantial absence of water by heating at a temperature between 150° C. and 225° C. by continuously adding a catalyst with a half-life of the order of under a few minutes at the polymerization temperature during the early stages of polymerization, and completing the polymerization by heat alone for a period of at least ten times the half-life of the catalyst at the polymerization temperature to produce a polymerization dope with a residual catalyst content not in excess of a few parts per million.

3. The method of rapidly polymerizing a diallyl phthalate in the substantial absence of water which comprises continuously adding to the polymerization mixture, maintained at a temperature between 150° C. and 225° C., small increments of a catalyst with half-life of the order of under a few minutes at the polymerization temperature during the early stages of polymerization, and completing the polymerization by heat alone for a time sufficient to reduce the catalyst content to a point not in excess of a few parts per million.

4. The method of claim 2 in which the monomer is diallyl phthalate.

5. The method of claim 2 in which the monomer is diallyl isophthalate.

References Cited

UNITED STATES PATENTS

| | | | |
|---|---|---|---|
| 2,273,891 | 2/1942 | Pollack et al. | 260—78 |
| 2,832,758 | 4/1958 | Heiberger et al. | 260—78.4 |

FOREIGN PATENTS

| | | |
|---|---|---|
| 458,647 | 8/1949 | Canada. |

JOSEPH L. SCHOFER, *Primary Examiner.*

C. A. HENDERSON, *Assistant Examiner.*

UNITED STATES PATENT OFFICE
CERTIFICATE OF CORRECTION

Patent No. 3,398,125                                              August 20, 1968

Sol A. Mednick

It is certified that error appears in the above identified patent and that said Letters Patent are hereby corrected as shown below:

Column 4, lines 27, 50 and 75, and column 5, line 7, "c./s.", each occurrence, should read -- c.s. --.

Signed and sealed this 24th day of February 1970.

(SEAL)
Attest:

Edward M. Fletcher, Jr.                              WILLIAM E. SCHUYLER, JR.
Attesting Officer                                            Commissioner of Patents